Figure 1:
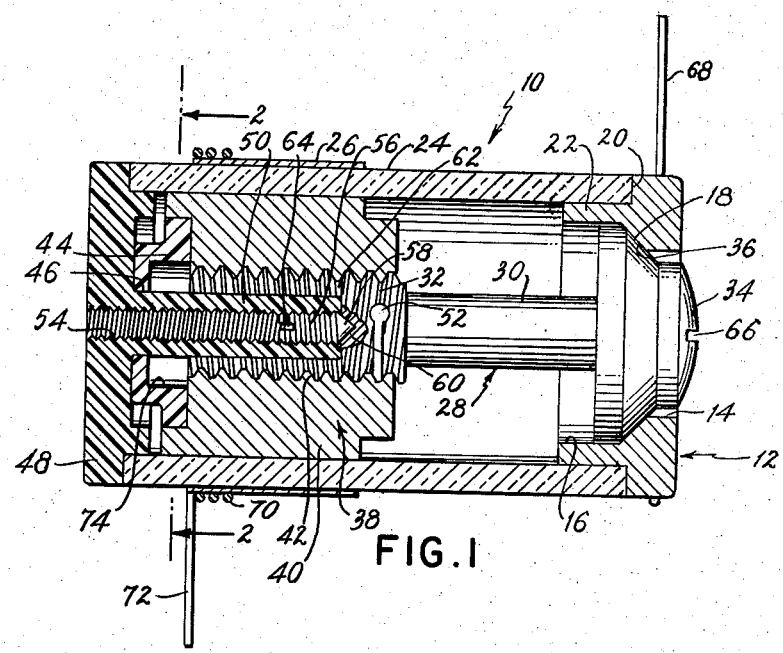

Aug. 13, 1963    L. T. BARNES    3,100,856
VARIABLE ELECTRICAL TRIMMER CAPACITOR
Filed March 13, 1961

INVENTOR.
*Llewellyn T. Barnes*
BY
*Amster & Levy*
ATTORNEYS

United States Patent Office 3,100,856
Patented Aug. 13, 1963

3,100,856
VARIABLE ELECTRICAL TRIMMER CAPACITOR
Llewellyn T. Barnes, 155 Atlantic Ave., Freeport, N.Y.
Filed Mar. 13, 1961, Ser. No. 95,191
5 Claims. (Cl. 317—249)

My invention relates to variable electrical capacitors and specifically to capacitors of the trimmer type which are used to produce precise capacity variations.

The present invention is a continuation-in-part of my copending application Serial No. 62,295, filed October 12, 1960, for Economy Piston Capacitor.

In my aforementioned United States patent application, Serial No. 62,295, I have disclosed a trimmer capacitor of the type in which a piston constituting a movable electrode is slidable within a cylindrical body made of dielectric material and having an external conductive coating constituting the fixed electrode or plate of the capacitor. The piston has an internally threaded bore which receives the threaded end of a rotatable adjusting member in such a manner that when the adjusting member is rotated, the piston is moved axially relative to the cylinder coating, thereby changing the capacitance of the unit. An anti back-lash mounting is supplied for the adjusting member in the nature of a spring exerting outward pressure on the adjusting member in such a manner as to maintain the threaded connection under constant tension.

The use of a spring to provide sufficient tension to eliminate back-lash has been found effective in operation, but has also presented several practical disadvantages. The springs themselves are relatively costly and increase the over-all manufacturing cost of the unit. Further, their tension is affected during continuous use and they are subject to breakage under heavy use and adverse weather conditions.

It is an object of the present invention to provide a trimmer capacitor of the type described in which an alternate means is provided to produce a biasing force on the adjusting member and to prevent back-lash, thereby eliminating the use of springs for this purpose.

In accordance with the present invention, there is provided a piston trimmer type capacitor having a cylindrical body of a high dielectric material. An adjusting member, which is threaded for only a small distance at one end, is frictionally mounted in a bushing attached to the cylindrical body. The threaded end of the adjusting member is in threaded engagement with one end of an internally threaded piston. The other end of the piston is attached to a washer having a square aperture which coacts with a square projection within the cylinder and thereby prevents the piston from rotating. Thus, rotation of the screw will result in only longitudinal motion of the piston relative to the metal band which serves as the fixed plate on the outside of the cylinder.

An important feature of my invention resides in the concept of providing novel means for eliminating back-lash. This feature is achieved by use of a tension screw which is threadedly fitted in the square projection and which engages the adjusting member. The adjusting member is provided with a keyhole slot therein so that tension on the adjusting member will slightly elastically stress the adjusting member to ensure a tight frictional fit of the adjusting member within the internally threaded piston thus eliminating back-lash.

One of the objects of the invention is to provide a piston type trimmer capacitor of the character described which requires a minimum of machining to produce.

Another object of the invention is to provide a piston-type trimmer capacitor of the character described which is extremely economical in manufacture in that elimination of back-lash is accomplished without the use of springs.

A further object of the invention is to provide a trimmer-type piston capacitor which is composed of few parts, is simple to construct and assemble, lends itself to mass production techniques, and at the same time is effective to prevent rotation of the piston.

Figure 2:
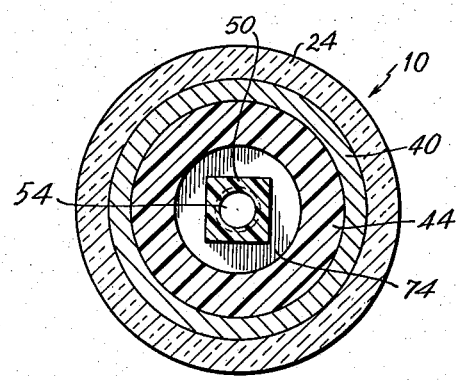

Additional objects and advantages of the invention will become apparent during the course of the following specification when taken in connection with the accompanying drawings, in which:

FIG. 1 is a longitudinal sectional view of a capacitor made in accordance with the invention; and, FIG. 2 is a transverse section taken along line 2—2 of FIG. 2.

With continuing reference to the drawings, wherein like reference numerals designate similar parts, there is shown a capacitor 10 made in accordance with the invention and having a front end bushing 12. The bushing 12 is formed with a central aperture 14 communicating with an inner bore or chamber 16. The bushing 12 also has a chamfered or tapered inner surface 18 adjacent aperture 14 for a reason hereinafter explained. Bushing 12 is also provided with front circumferential flange 20 from which projects a tubular portion 22 of reduced diameter and defining the inner bore 16.

A hollow cylinder 24, made of a dielectric material such as quartz, glass, "Titania" or the like, is rigidly and concentrically attached to the bushing 12. A band 26 of a conductive metal such as silver, is fitted about the outer surface of cylinder 24 adjacent the rear end thereof, and is secured to said cylinder outer surface, as by cementing. As an alternative, the band may be sprayed on the cylinder surface and then fired.

The tubular portion 22 of bushing 12 is inserted within the front open end of cylinder 24 and is secured therein as by cementing, with the end of cylinder 24 abutting flange 20 and chamber 16 communicating with the interior of cylinder 24.

The capacitor 10 also includes an adjusting member indicated generally by reference numeral 28 and comprising a cylindrical shank 30 terminating at one end in an enlarged threaded portion 32. The other end of shank 30 carries an integral terminal head piece 34. The head piece 34 has a tapering inner portion 36 which is complementary to the tapered surface 18 of bushing 12 adjacent aperture 14. In assembly, the bushing 12 can be slid into the front end of cylinder 24 with the head piece 34 of the mounted adjusting member 28 passing through the bushing bore 16 until tapering portion 36 of head piece 34 is seated upon the tapered surface 18 of said bushing 12.

The conductive band 26 constitutes a fixed electrode of the capacitor 10 exteriorly of the dielectric wall of cylinder 24. The capacitor 10 also includes a movable electrode designated generally by reference numeral 38. Electrode 38 is slidable in cylinder 24 along the inner surface thereof and comprises a cylindrical metal piston 40 having a central threaded bore 42, and a washer 44, made of non-conductive material, such as "Lucite," cemented to one end of piston 40. Washer 44 is provided with a square central aperture 46 which is in alignment with the threaded bore 42 of piston 40. The bore 42 is in threaded engagement with threaded portion 32 of adjusting member 28.

The cylinder 24 is closed off by an end cap 48 which is tightly fitted within the rear open end of cylinder 24, and cemented in place. The end cap 48 is provided with an integral inwardly-projecting post 50 of square cross-section. Post 50 is sized to closely fit within the square aperture 46 of washer 44. Thus, while washer 44 can slide along post 50, neither washer 44 nor the piston 40 carried thereby can rotate relative to post 50 or cylinder 24. Electrode 38 therefore is constrained to move longitudinally through cylinder 24 without rotation therein.

A keyhole-like slot 52 is provided in the threaded end portion 32 of shank 30, the slot 52 permitting a slight deformation in the length of said threaded end portion 32. The end of the threaded end portion 32 normally abuts the facing end of the square post 50.

The square post 50 is provided with an internally threaded bore 54 which is threaded in the opposite direction of the internal threaded bore 42. A tension screw 56 is threadedly engaged in the threaded bore 54. The tension screw has a conical or pointed tip 58 at the inner end thereof facing the threaded end portion 32 of shank 30. The pointed tip 58 forms a bearing or pressure point and seats in a conical depression 60 in the end face 62 of the threaded end portion 32 of shank 30 in bearing engagement. The opposite end of the tension screw 56 is provided with a kerf or slot 64 for facilitating the rotation of the tension screw 56 and hence the position of the bearing 58. Thus, a screwdriver or similar tool may be inserted through the rear open end of bore 54 until it engages the kerf 64 of tension screw 56. The tension screw 56 can then be manually adjusted until the proper tension is provided against the adjusting member threaded end portion 32.

Under pressure of tension screw 56, the sections of the threaded end portion 32 are pressed together, bringing the external threading slightly out of alignment with the meshing internal threading 42 of piston 40, and thereby creating a drag on this screw threading. This tensioned drag serves to provide smooth, uniform and fine adjusting movement of the piston 40, and also holds the latter in precise adjusted position at all times, even when subjected to jarring, vibration or the like, and also eliminating back-lash and creepage. Because of the reverse threading of the bore 54 and its contained tension screw 56, and because of the point contact provided by the tip 58 of said screw 56, rotation of adjusting member 28 will not produce a corresponding rotation of tension screw 56. Screw 56, rather, will tend to remain immovable.

The forward end of head-piece 34 projects slightly outwardly from the bushing aperture 14 and is provided with a kerf 66 at the outer end thereof for the reception of a screwdriver or similar bladed tool which may be used to facilitate the rotation thereof during adjustment.

The piston 40, front end bushing 12, and adjusting member 28 are made of a conductive metal which has an extremely low coefficient of thermal expansion. A terminal post 68 is mounted on the front end of bushing 12 and is thus electrically connected to piston 40 through the conductive adjusting member 28. A ring or rings 70 and integral terminal post 72 are secured to the band 26 on cylinder 24 by soldering to provide electrical contact therewith.

As was previously indicated, the metallic band 26 constitutes the fixed electrode of the capacitor 10. The band 26 and electrode 38 are separated by the body of cylinder 24 which has a high dielectric constant. The capacitance of the unit is changed rotating adjusting screw 28, this rotation being translated into longitudinal movement of piston 40 constituting movable electrode 38 relative to fixed band 26. The movable electrode 38 receives its charge through terminal 68, bushing 12 and adjusting member 28. The engaging tapering surfaces 18 of the bushing 12 and surface 36 of the headpiece 34 provide good electrical contact between the bushing 12 and the adjusting member 28, under the biasing force of tension screw 56.

In the position of the capacitor shown in FIG. 1, the piston 40 is in registry with the fixed electrode band 26, constituting a position of maximum capacitance. When the shank 30 is rotated by manual turning of the headpiece 34, the piston 40 travels in a right-hand direction as viewed in FIG. 1, away from the band 26, and the area of registry of the electrodes gradually decreases until the rear edge of the piston 40 reaches the forward (or right-hand) edge of the band 26, constituting the position of minimum capacitance. To permit such position to be reached, the washer 44 is cupped or depressed at its center, as indicated at 74, this depressed central area providing clearance about the shank threaded end portion 32 when the piston 40 approaches its position of minimum capacitance. Also the forward portion of piston 40 is provided with a reduced diameter, indicated at 76, which fits within the bushing bore 16 in the position of minimum capacitance.

Thus, it is seen from the above description, the only pieces of capacitor 10 which require extensive machining are the threaded portion 32, tension screw 56 and internally threaded piston 40 and square extension 50. The complete unit is easily assembled with a minimum of cementing and soldering. Thus, production costs and assembling costs are considerably decreased and the capacitor is capable of being more economically manufactured than was heretofore feasible.

It will be noted that the novel construction of the piston 40 and washer 44 permits the piston to travel between a position of complete registry with the fixed electrode or band 26 and a position wholly out of registry with said band 26, while at the same time keeping the length of the cylinder 24 to a minimum. Thus, a trimmer capacitor of exceptionally small length is provided for use with miniature electrical units or the like.

While a preferred embodiment of the invention has been shown and described herein, it is obvious that numerous changes, additions and omissions may be made in such embodiment without departing from the spirit and scope of the invention.

What I claim is:

1. A trimmer capacitor comprising a hollow cylinder formed of a material having a high dielectric constant, an adjusting member rotatably mounted in said cylinder and including a shank extending axially into the interior of said cylinder, an externally-threaded terminal portion at the end of said shank and having a slot therein for deformation of the external threading thereof, a piston electrode slidable in said cylinder, said piston electrode having an internally-threaded, longitudinal through bore receiving the threaded terminal portion of said shank, means for preventing rotation of said piston electrode within said cylinder so that said piston electrode is moved longitudinally through said cylinder when said shank is rotated, and adjustable means carried by said means for preventing rotation of said piston electrode extending longitudinally through the bore of said piston electrode and engaging said terminal portion of said shank for deforming said terminal portion of said shank so that said terminal portion of said shank is maintained in tight frictional engagement with said piston electrode in said internally-threaded bore.

2. A trimmer capacitor comprising a hollow cylinder formed of a material having a high dielectric constant, a bushing frictionally interfitting with and closing off one end of said cylinder, said bushing having a through aperture communicating with the interior of said cylinder, an adjusting member extending rotatably through said bushing aperture, said adjusting member having a head located outside said bushing, a shank carried by said head and extending longitudinally and centrally into the interior of said cylinder, and an externally-threaded terminal portion at the end of said shank, a cylindrical piston electrode slidable in said cylinder and having a central internally-threaded through bore receiving the threaded terminal portion of said shank, said piston carrying a terminal member having a non-circular aperture in communication with said threaded bore, and an end cap secured to the other end of said cylinder opposite said bushing and having a longitudinally-extending post of non-circular cross-section, said post slidably receiving the non-circular aperture of said terminal member and extending through the threaded bore of said piston and in abutting relationship with said terminal portion, said post preventing rotation of said piston electrode within said cylinder so that said piston electrode is moved longitudinally through said cylinder when said shank is rotated.

3. A trimmer capacitor comprising a hollow cylinder formed of a material having a high dielectric constant, a bushing frictionally interfitting with and closing off one end of said cylinder, said bushing having a through aperture communicating with the interior of said cylinder, an adjusting member extending rotatably through said bushing aperture, said adjusting member having a head located outside said bushing, a shank carried by said head and extending forwardly into the interior of said cylinder, and an externally-threaded terminal portion at the forward end of said shank, a cylindrical piston electrode slidable in said cylinder and having an internally-threaded through bore receiving the threaded terminal portion of said shank, said piston carrying at its forward end a member having a non-circular aperture in communication with said threaded bore, and an end cap secured to the forward end of said cylinder opposite said bushing and having a post of non-circular cross-section extending longitudinally through said threaded bore toward the threaded terminal portion of said shank, said post fitting slidably within said non-circular aperture and preventing rotation of said piston electrode within said cylinder so that said piston electrode is moved longitudinally through said cylinder when said shank is rotated, the terminal portion of said shank being slotted for deformation thereof, and adjustable screw means carried by said post engaging said terminal portion of said shank for deforming said terminal portion of said shank so that said terminal portion of said shank is maintained in tight frictional engagement with the internally threaded bore of said piston electrode.

4. A capacitor comprising a hollow cylinder, an adjusting member rotatably mounted in said cylinder, said adjusting member having an externally-threaded terminal portion disposed in said cylinder, a cylindrical piston electrode slidable in said cylinder and having an internally-threaded bore receiving said terminal portion, a member having a non-circular aperture, said member being fixed to said piston with said aperture being in communication with said bore, an end cap secured to said cylinder, said end cap having a post of a non-circular cross-section, said post fitting slidably within said non-circular aperture for preventing rotation of said piston electrode within said cylinder so that said piston electrode is moved longitudinally through said cylinder when said shank is rotated, said post having an internally threaded bore threaded in the opposite direction to said bore in said piston electrode, a tension screw secured in said bore in said post and engaging said terminal portion, said terminal portion having a key-hole slot therein so that force exerted by said tension screw on said terminal portion deforms said terminal portion to maintain said terminal portion in tight frictional engagement in said bore in said piston electrode.

5. A trimmer capacitor comprising a hollow cylinder formed of a material having a high dielectric constant, a bushing frictionally interfitting with and closing off one end of said cylinder, said bushing having a through aperture communicating with the interior of said cylinder, an adjusting member extending rotatably through said bushing aperture, said adjusting member having a head located outside said bushing, a shank carried by said head and extending into the interior of said cylinder, and an externally-threaded terminal portion at the end of said shank, a cylindrical piston electrode slidable in said cylinder and having an internally-threaded bore receiving the threaded terminal portion of said shank, said piston carrying a member having a non-circular aperture in communication with said threaded bore, and an end cap secured to the other end of said cylinder opposite said bushing and having a longitudinally-extending post of non-circular cross-section, said post fitting slidably within said non-circular aperture and preventing rotation of said piston electrode within said cylinder so that said piston electrode is moved longitudinally through said cylinder when said shank is rotated, said post having an internally threaded bore threaded in the opposite direction to said bore in said piston electrode, a tension screw secured in said bore in said post and engaging said terminal portion, said terminal portion having a key-hole slot therein so that force exerted by said tension screw on said terminal portion deforms said terminal portion to maintain said terminal portion in tight frictional engagement in said bore in said piston electrode.

References Cited in the file of this patent

UNITED STATES PATENTS

| 2,059,816 | Schwarzhaupt | Nov. 3, 1936 |

FOREIGN PATENTS

| 743,842 | Germany | Jan. 4, 1944 |